United States Patent [19]
Maynard

[11] Patent Number: 6,039,347
[45] Date of Patent: Mar. 21, 2000

[54] LIQUID PROPELLANT AIRBAG INFLATOR WITH DUAL TELESCOPING PISTONS

[75] Inventor: Alfred Charles Maynard, Pittsfield, Mass.

[73] Assignee: General Dynamics Armament Systems, Inc., Falls Church, Va.

[21] Appl. No.: 08/994,135

[22] Filed: Dec. 19, 1997

Related U.S. Application Data

[60] Provisional application No. 60/037,231, Feb. 3, 1997.

[51] Int. Cl.[7] ................................................ B60R 21/26
[52] U.S. Cl. ...................... 280/736; 280/741; 280/742; 280/737
[58] Field of Search ................................ 280/741, 737, 280/742, 736

[56] References Cited

U.S. PATENT DOCUMENTS

| 4,341,147 | 7/1982 | Mayer | 89/7 |
|---|---|---|---|
| 4,523,507 | 6/1985 | Magoon | 89/7 |
| 4,523,508 | 6/1985 | Mayer et al. | 89/7 |
| 4,693,165 | 9/1987 | Magoon et al. | 89/7 |
| 4,745,841 | 5/1988 | Magoon et al. | 89/7 |
| 4,907,486 | 3/1990 | Mayer | 89/7 |
| 5,060,973 | 10/1991 | Giovanetti | 280/736 |
| 5,284,330 | 2/1994 | Carlson et al. | 267/140.14 |
| 5,415,845 | 5/1995 | Brede et al. | 422/305 |
| 5,487,561 | 1/1996 | Mandzy et al. | 280/741 |
| 5,639,117 | 6/1997 | Mandzy et al. | 280/741 |
| 5,669,631 | 9/1997 | Johnson et al. | 280/741 |
| 5,695,216 | 12/1997 | Sandstrom et al. | 280/737 |
| 5,713,596 | 2/1998 | Messina et al. | 280/737 |
| 5,719,351 | 2/1998 | Johnson et al. | 102/440 |

*Primary Examiner*—Lanna Mai
*Assistant Examiner*—Andrew J. Ririe
*Attorney, Agent, or Firm*—Finnegan, Henderson, Farabow, Garrett & Dunner

[57] ABSTRACT

An airbag inflator includes a pair of telescoping pistons slidingly mounted within a housing. Pressurization of a combustion chamber by a pyrotechnic initiator acts on one piston to pressurize a hydraulic fluid chamber, which, in turn, acts on the other piston to pressurize a liquid propellant reservoir. Liquid propellant can then be regeneratively pumped from the reservoir into the combustion chamber for combustion to generate an airbag inflation gas. A hydraulic fluid damping chamber is utilized to exert a controllable retarding force on the one piston, such as to control the rate of airbag inflation gas generation.

25 Claims, 6 Drawing Sheets

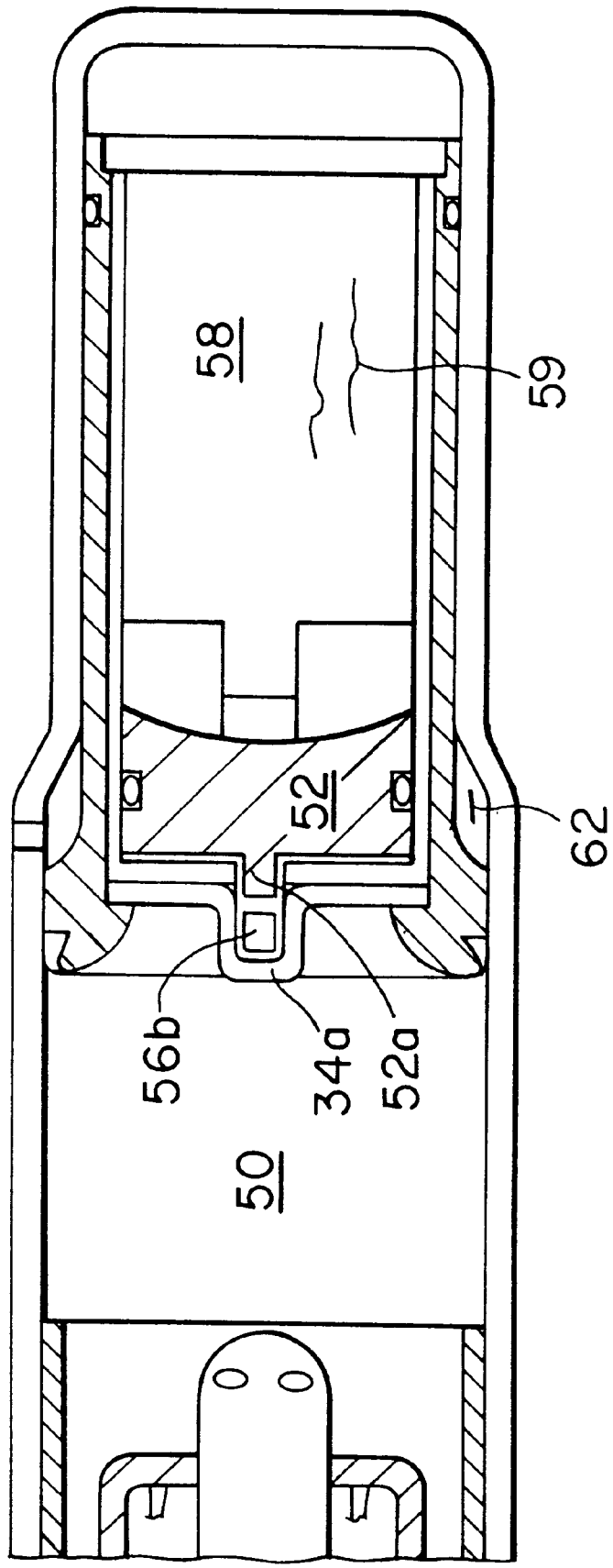

LIQUID PROPELLANT AIRBAG INFLATOR WITH DUAL TELESCOPING PISTONS

This application claims priority from U.S. Provisional Application Ser. No. 60/037,231, filed Feb. 3, 1997.

FIELD OF THE INVENTION

The present invention relates to safety apparatus, and particularly to passive restraint apparatus utilizing an inflatable airbag for preventing serious injury to occupants of a motor vehicle involved in an accident.

BACKGROUND OF THE INVENTION

"Passive" restraint apparatus, which requires no action by a vehicle occupant to render operative, as contrasted to "active" restraint apparatus requiring a conscious effort by an occupant to render operative (such as conventional seat belts), are now commonly included as standard equipment in motor vehicles due to government agency, insurance industry, and consumer pressures. Experience and testing have shown that the most effective passive occupant restraint approach is to abruptly (in a matter of milliseconds) inflate an airbag automatically in response to a high impact accident. The inflated air bag cushions a vehicle occupant from the effects of the accident for an interval sufficient to prevent serious injury.

The typical airbag inflation apparatus uses ignitable propellants that are combusted to rapidly generating a large volume of bag inflation gas by exothermic reaction. Heretofore, the propellants invariably have been in a solid or granular form and comprised of low energy compositions, such as an alkali metal azide, cupric oxide, boron nitrate, etc. The solid propellants need not be stored under pressure, are stable over time under varying ambient conditions, and are convenient to package in a passive restraint apparatus.

As an alternative to the use of propellants in solid or granular form as the inflation gas generator, liquid propellants for this purpose are being investigated. Viable approaches to using a liquid propellant in an airbag inflator are disclosed in U.S. Pat. No. 5,060,973, issued to Giovanetti; U.S. Pat. Nos. 5,487,561 and 5,639,117, issued to Mandzy et al.; and Messina et al., U.S. patent application Ser. No. 08/674,063, filed Jul. 1, 1996. The numerous advantages afforded by the use of liquid propellants in an airbag inflation apparatus are noted in these patent documents, the disclosures of which are incorporated herein by reference.

To protect passengers, as well as drivers of vehicles, airbags are now being installed in dashboards for protection against frontal collisions and in doors for protection against side impact collisions. Bag size and inflation parameters are dependent on the particular installation site, and each installation varies according to vehicle type and make. Thus, bag inflators must be designed not only to satisfy the unique inflation parameters appropriate for each particular installation site, but also must be sized to fit into the available space that is unique to each installation site. Regarding inflation parameters, recent studies have indicated that particularly abrupt bag inflation, rather than protecting vehicle occupants in the event of a high impact accident, may instead inflict injury, even death, to occupants; this is particularly so in the case of children.

SUMMARY OF THE INVENTION

It is an objective of the present invention to provide an improved apparatus for inflating an airbag using a liquid propellant, wherein combustion of the liquid propellant may be controlled to achieve a programmed rate of bag inflation appropriate to the installation site of the apparatus in a motor vehicle and thus protect occupants from the effects of both an accident and bag inflation itself.

To achieve this objective in accordance with the present invention, there is provided an airbag inflator that comprises a housing having a vent in fluid communication with the airbag; first and second telescoping pistons mounted for axial sliding motion within the housing; a combustion chamber and a liquid propellant reservoir within the housing; an injection orifice, through which liquid propellant may flow from the reservoir into the combustion chamber; and a coupling chamber within the housing containing a hydraulic fluid exposed to the first and second pistons.

The airbag inflator further includes a pyrotechnic initiator within the housing operable to pressurize the combustion chamber, the combustion chamber pressure exerting a force tending to drive the first piston in a first axial direction to pressurize the coupling chamber hydraulic fluid, and the pressurized coupling chamber hydraulic fluid exerting a force tending to drive the second piston in a second axial direction opposite the first axial direction to pressurize the liquid propellant in the reservoir, the liquid propellant pressure exceeding the combustion chamber pressure, such that the liquid propellant may be regeneratively pumped through the injection orifice into the combustion chamber for combustion to produce airbag inflation gas.

Additional features, advantages and objectives of the present invention will be set forth in the description that follows and in part will be apparent from the description, or may be learned by practice of the invention. The objectives and advantages of the present invention will be realized and obtained by the apparatus particularly pointed out in the following written description and the appended claims, as well in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention, and together with the description, serve to explain the principles of the invention.

BRIEF DESCRIPTION OF THE DRAWINGS

The accompanying drawings, which are incorporated in and constitute a part of this specification, illustrate embodiments of the invention and, together with the following detailed description, serve to explain the objectives, advantages, and principles of the invention.

FIG. 3 is a sectional view, partially broken away, illustrating the stroke-end positions of the telescoping pistons in the airbag inflator of FIG. 1;

Like reference numerals refer to corresponding parts throughout the several views of the drawings.

DETAILED DESCRIPTION OF THE INVENTION

Figure 1:
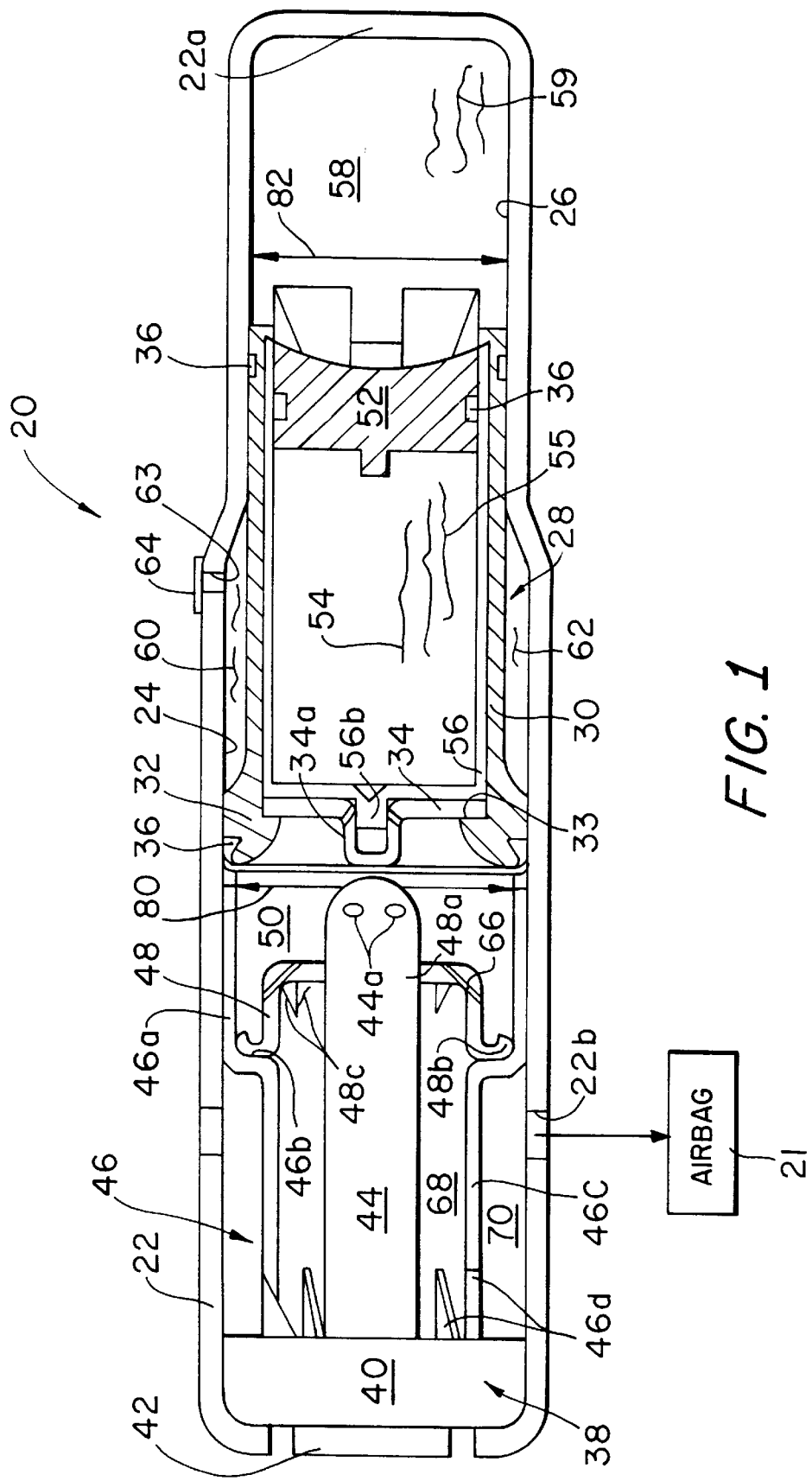
FIG. 1 is a sectional view of an airbag inflator consistent with an embodiment of the present invention.

In the embodiment of the present invention illustrated in FIG. 1, an airbag inflator, generally indicated at 20, includes a cylindrical housing 22 formed to provide a large diameter bore 24 and a small diameter bore 26. A piston, generally indicated at 28, is comprised of a cylindrical skirt 30 slidingly received in housing bore 26 and annular piston head 32, slidingly received in housing bore 24. Piston head 32 is machined to provide an interior annular ledge 33 for seating a circular orifice plate 34. O-rings 36, lodged in peripheral surface grooves in annular piston head 32 and skirt 30 provide sliding fluid seals with respective bores 24 and 26.

The left end of housing 22 is swaged inward to seat an initiator assembly, generally indicated at 38, which includes a base 40 mounting a pyrotechnic detonator 42 and a tube 44 extending axially rightwardly to a closed end situated proximate orifice plate 34. Base 40 is fluid sealed in the left end of housing 22 by suitable means, such as weldments (not shown), and also serves to mount a cup-shaped outer baffle 46 having a rightward cylindrical section 46a conforming to the inner cup-shaped baffle 48 includes a central opening 48a, through which initiator tube 44 extends, and an outwardly curled brim 48b seated against a ledge 46b formed by the transition of baffle 46 between its large diameter section 46a and a reduced diameter section 46c extending outwardly to base 40.

Piston head 32, orifice plate 34, baffle 48, baffle section 46a, and the terminal portion of initiator tube 44 define a combustion chamber 50. Slidingly received in telescopic fashion within the open right end of piston skirt 30 is a second piston 52, which defines, with orifice plate 34, the axial bounds of a reservoir 54 containing a liquid propellant 55. Suitable liquid propellant compositions are disclosed in the application and patents cited above. As illustrated in FIG. 1, the interior cylindrical wall of piston skirt 30 and the right face of orifice plate 34 are covered by a cup-shaped liner 56 of a suitable material, such as PVD, HDPE, or PTEE, selected to protect these members from long-term exposure to and possible degradation by the liquid propellant 55 in reservoir 54. An annular groove in the periphery of piston 52 is fitted with an O-ring 36 to achieve a sliding fluid seal with liner 56. A coupling chamber 58, defined between piston 52 and closed right end 22a of housing 22, contains a hydraulic fluid 59. Hydraulic fluid 60 also fills an annular damping chamber 62 defined between piston skirt 30 and the large diameter bore 24 of housing 22. This chamber 62 is vented through a housing port 63, which is normally sealed by a frangible patch 64.

Airbag deployment is initiated by electrically firing detonator 42 in response to a high-impact vehicle collision, such as by closure of an inertial switch (not shown). When fired, detonator 42 ignites a solid propellant in initiator tube 44. The resulting combustion gases exhaust through tube apertures 44a into combustion chamber 50. The resulting pressurization of the combustion chamber produces a rightward force on piston 28, which is resisted by pressurization of the incompressible hydraulic fluid 59 in chamber 58. Pressurization of chamber 58 exerts a leftward force on piston 52, pressurizing liquid propellant 55 in reservoir 54.

Figure 2A:
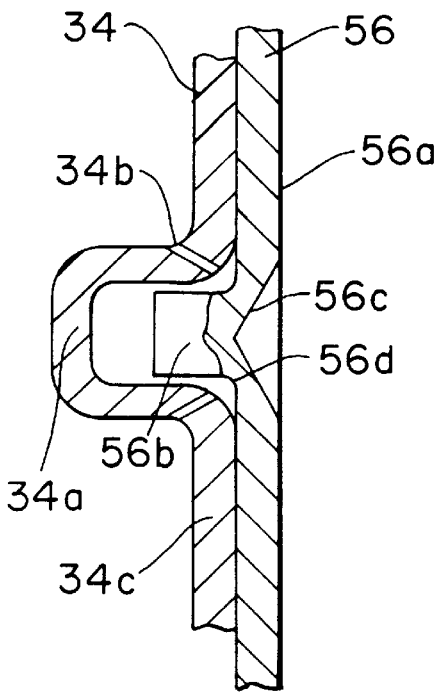
FIGS. 2A–2D are fragmentary sectional views illustrating various structural arrangements for opening injection orifices to the flow of liquid propellant from a reservoir into a combustion chamber.
Figure 2B:
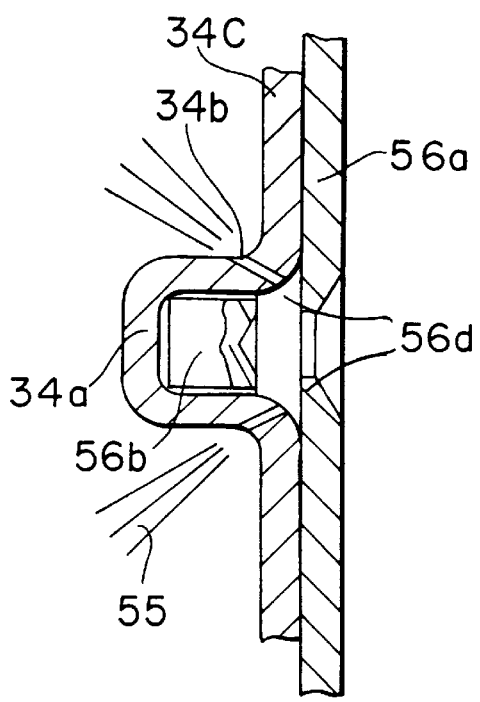

As best seen in the fragmentary sectional view of FIG. 2A, a central portion of radial orifice plate 34 is deformed leftwardly to provide a well 34a. In addition, a plurality of angularly spaced injection orifices 34b are drilled through orifice plate at the annular junction between well 34a and the surrounding radial section 34c of the orifice plate. The radial wall 56a of liner 56, pressed against the right face of orifice plate 34, is formed with post 56b protruding partially into well 34a. A conical depression 56c is undercut in liner wall 56a opposite post 56b to create a thin-walled, pressure-frangible, annular junction 56d between post 56b and liner radial wall section 56a. As illustrated in FIG. 2B, when liquid propellant reservoir 54 is sufficiently pressurized as the result of pressurization of combustion chamber 50 by the combusting solid propellant in initiator tube 44, liner junction 56d ruptures, and post 56b is driven fully into well 34a, clearing orifices 34b for injection of liquid propellant 55 from reservoir 54 into the combustion chamber. There, the liquid propellant is ignited by the solid propellant combustion gases to produce airbag inflation gases.

Returning to FIG. 1, angularly spaced cuts are made around the annular corner of inner baffle 48 to create exhaust ports 48c, which are normally closed by frangible seals 66. These seals, taped over exhaust ports 48c, are designed to rupture when the combustion chamber pressure exceeds a desired threshold or to burn away during initial combustion in combustion chamber 50. In either case, combustion gases then exit the combustion chamber into an annular chamber 68 between baffles 46, 48 and initiator tube 44. From there, the combustion gases exit through slots 46d in baffle 46 into an annular chamber 70 between baffle section 46c and housing bore 24. After mixing and cooling in chambers 68 and 70, the combustion gases exhaust through housing ports 22b into a manifold (not shown) leading to an airbag 21.

Figure 2C:
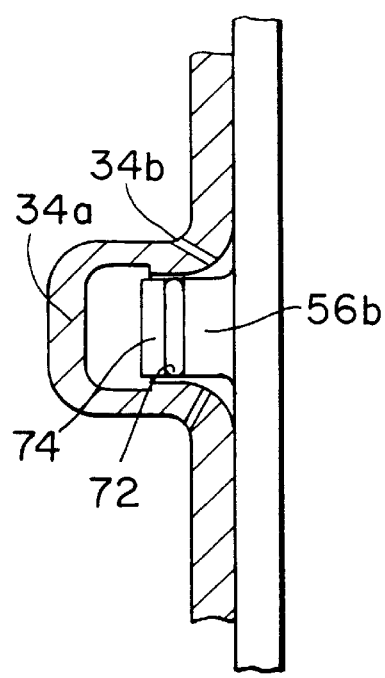

FIG. 2C illustrates a modification in the formation of liner post 56b seen in FIG. 2A, wherein an annular groove is cut in the post to receive an O-ring 72 providing a fluid seal with the inner wall of well 34a. This seal prevents combustion gases in combustion chamber 50 from flowing through orifices 34b into well 34a prior to rupture of frangible junction 56d. If this occurs, the resulting back pressure on post 56b raises the liquid propellant reservoir pressure threshold necessary to rupture frangible junction 56d to begin liquid propellant injection into combustion chamber 50. From the standpoint of manufacturing economy and rupture pressure threshold repeatability, the use of O-ring seal 72 to prevent combustion gas infiltration into well 34a is preferred to applying frangible patch seals over injection orifices 34b. As also seen in FIG. 2C, the interior wall of well 34a may be cut back, as indicated at 74, such that, when post 56b is driven into well 34a (FIG. 2B), compressed air trapped behind the post can escape past seal 72.

Figure 2D:
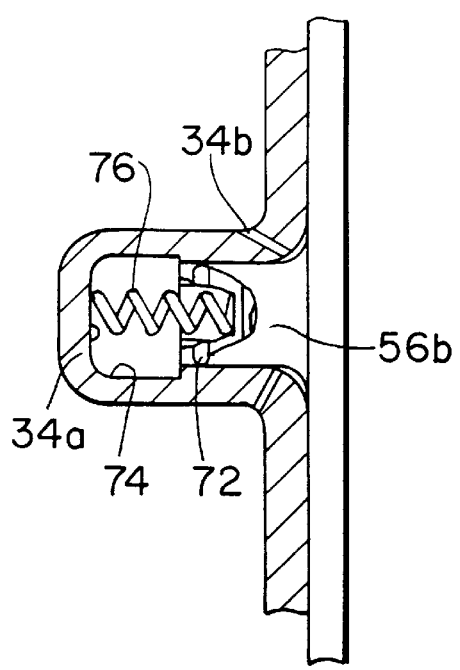

As a further alternative seen in FIG. 2D, injection orifices 34b may be angle-drilled through the cylindrical side wall of well 34a, and post 56b may be sized to closely fit the inner diameter of well 34a, such as to block the injection orifices prior to rupture of frangible junction 56d. To further ensure against combustion gas infiltration into well 34a, post 56b may be fitted with O-ring seal 72. Again, cutback 74 in the well interior wall may be provided to allow trapped air to escape as post 56b is driven into the well to unblock orifices 34b when frangible junction 56d ruptures. As an added feature, post 56b may be backed by a spring 76 that allows the separated post to be driven into well sufficiently to unblock orifices 34b. However, when the pressure in liquid propellant reservoir 54 drops below a predetermined threshold, spring 76 drives post 56b back into a blocking relation with orifices 34b to act as a check valve, preventing backflow of combustion gases from combustion chamber 50 through orifices 34b into liquid propellant reservoir 54.

Returning to FIG. 1, as noted above, initiator 38 begins airbag deployment by igniting the solid propellant in tube 44, producing combustion gases to pressurize combustion chamber 50. This combustion chamber pressure acts on an exposed area of piston 28 (having a diameter represented at 80), to produce a force attempting to drive piston 28 rightward. In opposition, the hydraulic fluid 59 in chamber 58 is pressurized, and the resulting hydraulic fluid pressure acts on an exposed area having a diameter represented at 82. Since the area (right faces of pistons 28 and 52) represented by diameter 82 is less than the area represented by diameter 80, the fluid pressure in hydraulic fluid chamber 58 will always exceed the fluid pressure in combustion chamber 50 by a ratio of the square of their diameters 80:82. Since the faces of piston 52 confronting chamber 58 and liquid propellant reservoir 54 are of equal area, the fluid pressures in these two chambers are also equal, neglecting friction on piston 52. Consequently, the fluid pressure in reservoir 54 also exceeds the fluid pressure in combustion chamber 50 by the square of the same diameter ratio 80:82, thereby providing a consistent regenerative pumping pressure effective to inject liquid propellant 55 through orifices 34b into combustion chamber 50 for combustion throughout an airbag inflation cycle. This regenerative pumping pressure causes the leftward displacement of piston 52 to exceed the rightward displacement of piston 28.

Since the fluid pressures in reservoir 54 and chamber 58 are substantially equal throughout the deployment cycle, there is only a small pressure drop across O-ring seal 36 on piston 52. This ensures complete isolation between the liquid propellant 55 in reservoir 54 and hydraulic fluid 59 in chamber 58.

FIG. 3 illustrates the positions of pistons 28 and 52 at the end of a deployment cycle. Note that a central post 52a on piston 52 has entered well 34a of orifice plate 34 to ensure that essentially all liquid propellant 55 has been pumped from reservoir 54.

Figure 4:
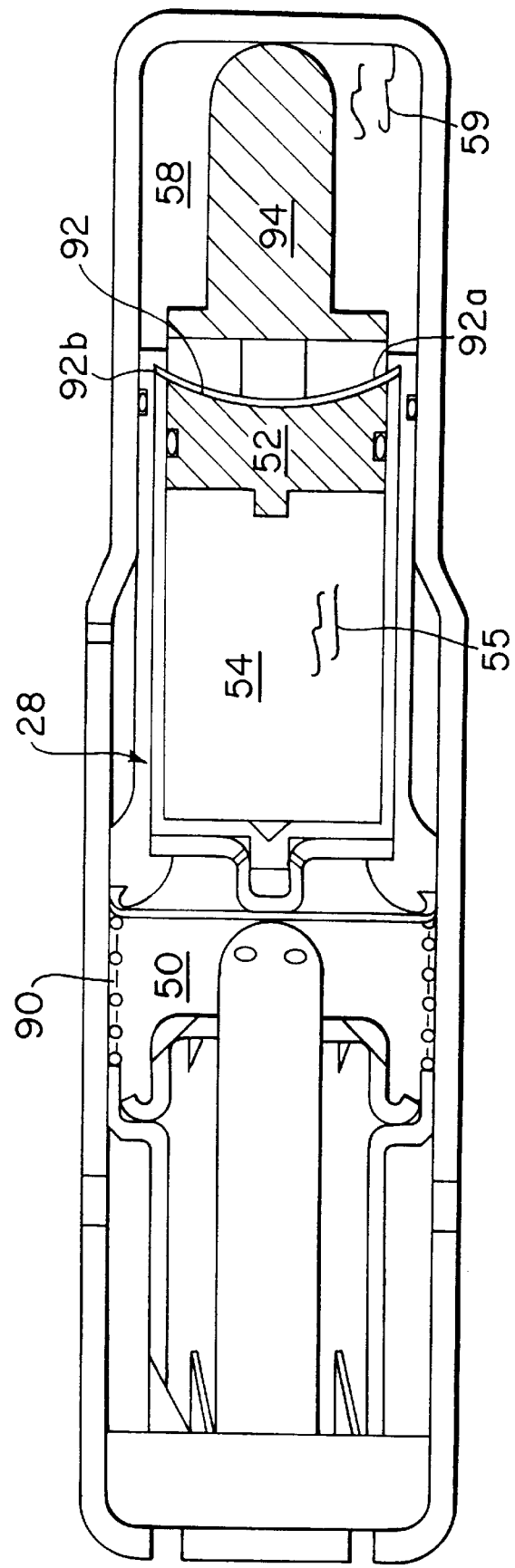
FIG. 4 is a sectional view illustrating performance-enhancing features that may be added to the airbag inflator of FIG. 1.

As illustrated in FIG. 4, to accommodate thermal expansion and contraction of the fluids in chamber 58 and reservoir 54, a compression spring 90 may be installed in combustion chamber 50 to exert a counteracting rightward force on piston 28. Further, a bowed leaf spring 92 may be fitted in a transverse, concave groove 92a in the right face of piston 52, with the ends of this leaf spring initially received in notches 92b provided in skirt 30 of piston 28. Leaf spring 92 serves to control the displacement of piston 52 relative to piston 28 during thermal expansions and contractions of the fluids in reservoir 54 and chamber 58. Further, by providing leaf spring 92 as a bimetallic strip, such that its curvature decreases with increasing temperature, pressure fluctuations of the liquid propellant 55 in reservoir 54 can be minimized. Spring 90 is also effective to cushion the liquid propellant 55 against axial shock loading.

To reduce compliance of the hydraulic fluid 59 in chamber 58 at ignition and ensuing liquid propellant combustion in chamber 50, piston 52 may also be fitted with a protuberance 94 extending into hydraulic fluid reservoir 58, as seen in FIG. 4. Prior to ignition by initiator assembly 38, spring 90 pushes piston 28 rightward into chamber 58 to the point where the end of protuberance 94 hits the right endwall of housing 22. By virtue of leaf spring 92, piston 52 moves rightward with piston 28. Then, when combustion chamber 50 is pressurized by action of the initiator assembly, rightward displacement of piston 28, into chamber 58 forces leftward movement of piston 52 into reservoir 54 to precipitate liquid propellant injection into the combustion chamber.

Returning to FIG. 1, it will be appreciated that the rate of rightward displacement of piston 28 determines the rate of leftward displacement of piston 52, which, in turn, determines the rate of injection of liquid propellant 55 into combustion chamber 50. The liquid propellant injection rate then determines the liquid propellant combustion rate, which, in turn determines the airbag inflation rate. Thus, the rate of rightward displacement of piston 28 determines airbag inflation rate. It is seen that rightward movement of piston 28 reduces the volume of damping chamber 62 and thus pressurizes hydraulic fluid 60 therein to exert a force in opposition to piston rightward displacement. The rate at which hydraulic fluid 60 is exhausted from chamber 62 through housing port 63 can therefore control the rate of rightward displacement of piston 28, which, as noted above, controls airbag inflation rate. In the inflator embodiment illustrated in FIG. 1, the exhaust rate of hydraulic fluid 60 from chamber 62 is largely determined by the fixed size of housing port 63.

Figure 5B:
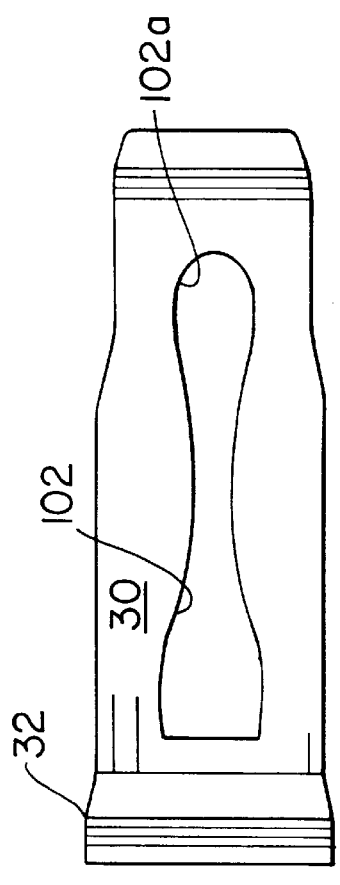
FIG. 5B is a side view of one of the telescoping pistons in the airbag inflator of FIG. 5A.
Figure 5A:
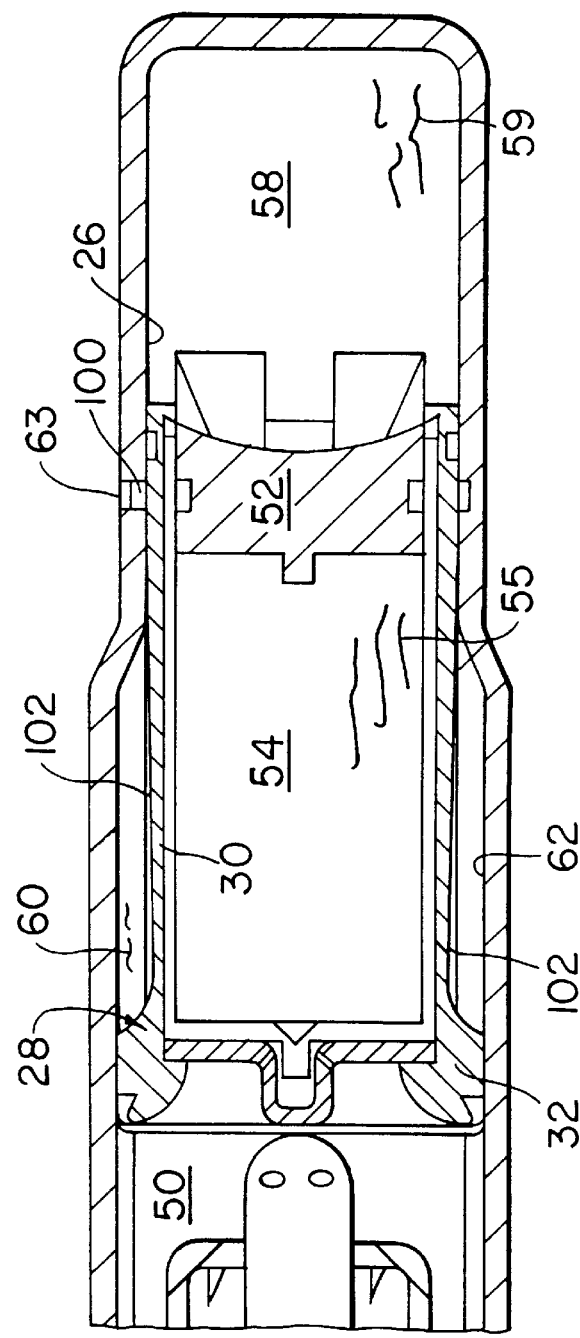
FIG. 5A is a sectional view, partially broken away, illustrating an airbag inflator consistent with a second embodiment of the invention.

The inflator embodiment of FIGS. 5A and 5B is equipped to vary the exhaust rate of hydraulic fluid 60 from damping chamber 62 during the rightward stroke of piston 28. To this end, housing port 63 is moved to the section of housing 22 defining housing bore 26, such that it can be blocked by skirt 30 of piston 28 prior to initiation of an airbag deployment cycle. An annular groove 100 is cut in housing bore 26 at an axial position intersecting housing port 63. Piston skirt 30 is machined to provide a plurality of angularly spaced, exterior surface grooves 102 extending axially from leading ends 102a located immediately leftward of housing groove 100 back to annular piston head 32. Thus, with initial rightward motion of piston 28 forced by initiator pressurization of combustion chamber 50, the leading ends 102a of skirt grooves 102 open into groove 100 to unblock housing port 63. To accommodate this initial rightward movement of piston 28, chamber 58 is not completely filled with hydraulic fluid 59, thereby leaving a pocket of air that can be compressed by piston 28. As illustrated, the width and depth of the skirt grooves may be along their lengths to, in effect, vary the exhaust port open area and thus vary the hydraulic fluid exhaust rate through housing vent 63 as a function of piston 28 displacement. As such, the displacement rate of piston 28 may be varied throughout its rightward stroke to achieve a desired airbag inflation rate profile. For example, skirt grooves 102 may be contoured in depth and width along their lengths to achieve a rapid initial airbag deployment rate, followed by a reduced deployment rate during mid-stroke of piston 28, and concluding with higher airbag deployment rate toward the end of piston stroke.

Figure 6:
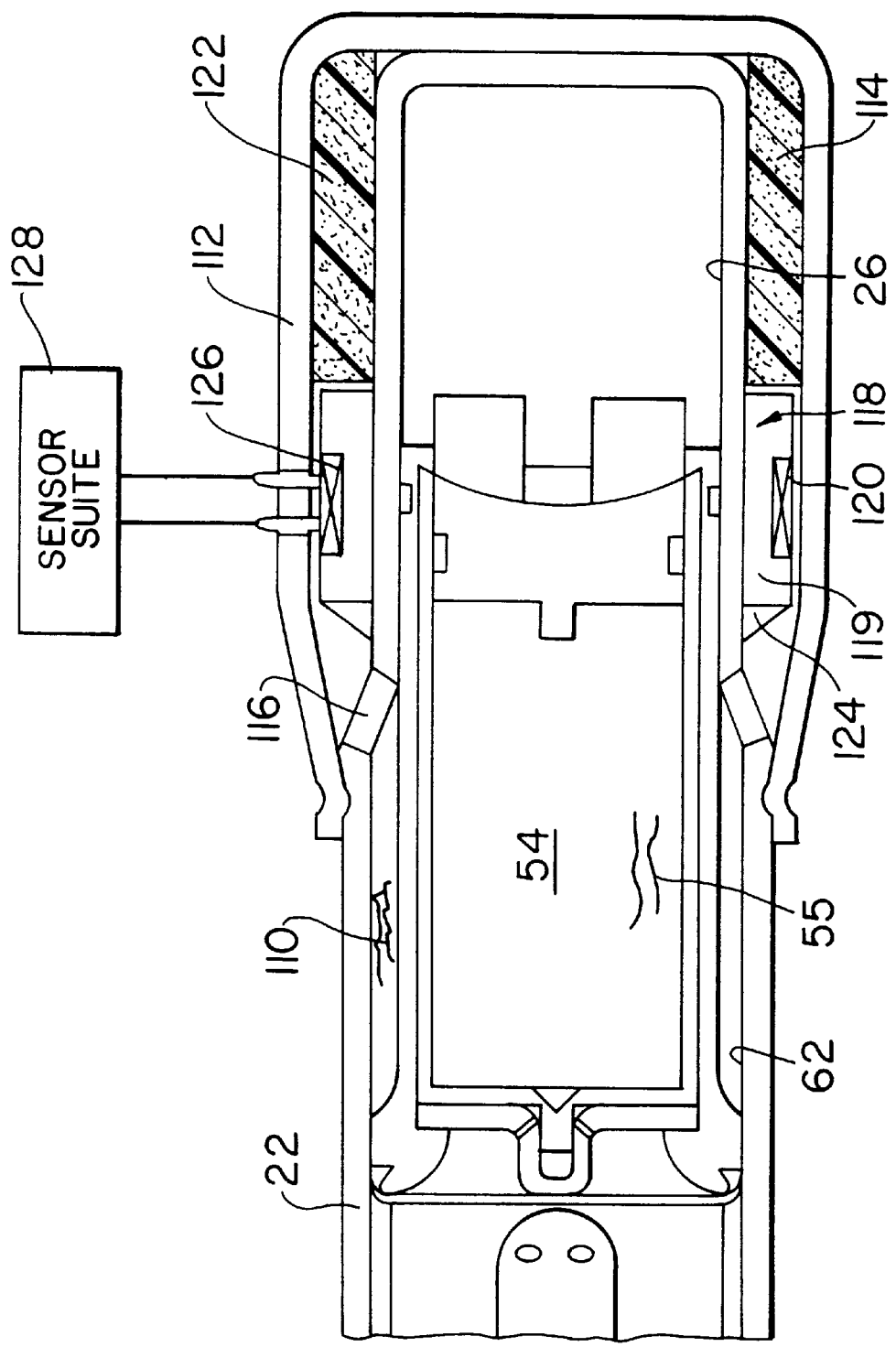
FIG. 6 is a sectional view, partially broken away, illustrating an airbag inflator consistent with a third embodiment of the invention.

In the manner disclosed in Brown et al., U.S. patent application Ser. No. 08/995,419, filed Dec. 19, 1997, entitled "Inflator Capable of Modulating Airbag Inflation Rate in a Vehicle Occupant Restraint Apparatus," and filed concurrently herewith, the disclosure of this application is incorporated herein by reference, inflator 20 may be equipped to function as a "smart" inflator, as illustrated in FIG. 6. To this end, annular damping chamber 62 is filled with a magnetorheological hydraulic fluid 110. The reduced diameter bore 26 section of housing 22 is jacketed by a secondary cup-shaped housing 112 to provide an annular chamber 114 in fluid communication with chamber 62 through angularly distributed ports 116. Positioned within chamber 114 is an electromagnet 118 having an annular core 119 in snug-fit relation about housing 22 and in closely spaced relation with housing 112 to define an annular gap 120. A sleeve 122 of closed cell foam fills chamber 114 rightward of core 118. An annular scoop 124 is positioned in chamber 114 to direct magnetorheological fluid 110 flowing from chamber 62 through ports 116 past gap 120. Therebeyond, the magnetorheological fluid is absorbed in sleeve 122, serving as an accumulator.

Winding 126 of electromagnet 118 is connected for controlled current energization from a sensor suite 128 to generate a magnetic field in gap 120. As described in the cited Brown et al. application, the viscosity of magnetorheological fluid 110 flowing through gap 120 can be regulated by the intensity of the magnetic field generated by electromagnet 118. Since the rate at which magnetorheological fluid 110 flows through gap 120 determines the rate at which this fluid can be exhausted from chamber 62 and is a direct function of its viscosity, varying the magnetic field in gap 120 varies the displacement rate of piston 28. It is thus seen that airbag inflation rate can be tailored to particular vehicle collision and occupant parameters detected by sensors making up sensor suite 128 by controlling magnetic field intensity on a real time basis, all as fully described in the cited Brown et al. application.

It will be apparent to those skilled in the art that various modifications and variations may be made in the airbag inflator of the present invention without departing from the spirit or scope of the invention. Thus, it is intended that the present invention cover modifications and variations of this invention provided they come within the scope of the appended claims and their equivalents.

What is claimed is:

1. An airbag inflator comprising:
    a housing;
    first and second pistons in telescoping relation to one another and mounted for axial sliding motion within the housing;
    a combustion chamber within the housing;
    a reservoir within the housing containing a liquid propellant;
    an injection orifice, through which the liquid propellant may flow from the reservoir into the combustion chamber;
    a coupling chamber within the housing containing a hydraulic fluid exposed to the first and second pistons; and
    a pyrotechnic initiator within the housing operable to pressurize the combustion chamber, the combustion chamber pressure exerting a force tending to drive the first piston in a first axial direction to pressurize the coupling chamber hydraulic fluid, and the pressurized coupling chamber hydraulic fluid exerting a force tending to drive the second piston in a second axial direction opposite the first axial direction to pressurize the liquid propellant in the reservoir, the liquid propellant pressure exceeding the combustion chamber pressure, such that the liquid propellant may be regeneratively pumped through the injection orifice into the combustion chamber for combustion to produce airbag inflation gas.

2. The airbag inflator of claim 1, further comprising a damping chamber within the housing chamber containing a hydraulic fluid exposed to the first piston, motion of the first piston in the first axial direction pressurizing the damping chamber hydraulic fluid, such as to exert a retarding force on the first piston affecting a rate of the motion in the first axial direction.

3. The airbag inflator of claim 2, wherein the damping chamber hydraulic fluid is a magnetorheological hydraulic fluid, the airbag inflator further comprising an electromagnet for generating a magnetic field in a gap through which the magnetorheological hydraulic fluid flows from the damping chamber while pressurized by the motion of the first piston in the first axial direction, variations in the magnetic field varying the viscosity of the magnetorheological fluid to produce corresponding variations in the retarding force.

4. The airbag inflator of claim 3, wherein the second piston is telescopically received within the first piston.

5. The airbag inflator of claim 4, wherein the liquid propellant reservoir is defined between the first piston and a front face of the second piston.

6. The airbag inflator of claim 5, wherein the coupling chamber is defined between rear faces of the first and second pistons and a rear section of the housing.

7. The airbag inflator defined in claim 6, wherein the injection orifice is included in a front face of the first piston.

8. The airbag inflator defined in claim 7, wherein the housing includes a first bore in a forward section thereof and a second bore in the rear section thereof, the first bore having a larger diameter than the second bore, and wherein the first piston comprises a head slidingly received in the first bore and including the front face, and a conjoined cylindrical skirt, slidingly received in the second bore and having a free end including the rear face, the second piston slidingly received within the cylindrical skirt.

9. The airbag inflator of claim 8, wherein the initiator is mounted in a forward end of the housing and includes a solid propellant-containing tube having an apertured terminal portion projecting into the combustion chamber.

10. The airbag inflator of claim 9, further comprising baffles positioned in the forward housing section, at least one of the baffles positioned in confronting relation with the first piston front face to define a boundary of the combustion chamber, the one baffle including pressure-frangible ports that open to permit escape of airbag inflation gas when the combustion chamber pressure exceeds a threshold pressure, the escaping airbag inflation gas flowing through openings in another of the baffles leading to an exhaust port in the housing.

11. The airbag inflator of claim 8, further comprising a compression spring positioned to exert a force on the first piston in the first axial direction.

12. The airbag inflator of claim 8, further comprising a bowed leaf spring disposed against a concave groove surface provided in the second piston rear face, opposed end portions of the leaf spring engaged in notches provided in the first piston skirt.

13. The airbag inflator of claim 8, further comprising a protuberance mounted to the second piston rear face for projection through the coupling chamber into contact with an endwall of the rear housing section.

14. The airbag inflator of claim 8, further comprising an encapsulation liner including a cylindrical wall covering an interior surface of the first piston cylindrical skirt and a radial wall covering the first piston front face, the liner radial wall including a pressure frangible section normally blocking the injection orifice in the first piston front face.

15. The airbag inflator of claim 14, wherein the first piston front face includes an orifice plate having a radial wall section surrounding a central well projecting into the combustion chamber and a plurality of injection orifices, and the liner radial wall including a radial wall section lying against the orifice plate radial wall section and an outstanding post joined to the liner radial wall section by the pressure frangible section and projecting partially into the well, upon rupture of the pressure frangible section due to pressurization of the liquid propellant in the reservoir, the post being freed to move further into the well, such as to expose the injection orifices for injection therethrough of the liquid propellant into the combustion chamber.

16. The airbag inflator of claim 15, wherein the post is equipped with an O-ring seal to provide a fluid seal with an entry portion of an interior surface of the well.

17. The airbag inflator of claim 16, wherein a bottom portion of the well interior surface is recessed to allow trapped air to escape past the O-ring seal.

18. The airbag inflator defined in claim 17, wherein the injection orifices are drilled through a sidewall of the well to provide open ends at the entry portion of the well interior surface, the post being sized to block the injection orifice open ends prior to rupture of the pressure frangible section, the airbag inflator further comprising a spring positioned in the well to bias the freed post back toward the entry portion of the well interior surface, such as to block the injection orifice open ends should the liquid propellant pressure in the reservoir fall to a low level.

19. The airbag inflator of claim 8, wherein the damping chamber is an annular chamber defined between the first housing bore and the first piston skirt.

20. The airbag inflator of claim 19, further comprising an accumulator chamber in fluid flow communication with the damping chamber through at least one port, the electromagnet positioned in the accumulator chamber.

21. The airbag inflator of claim 20, further comprising an absorbent material member positioned in the accumulative chamber.

22. The airbag inflator of claim 20, further comprising a jacket fixed to the housing to provide the accumulator chamber as an annular chamber surrounding the rear section of the housing.

23. The airbag inflator of claim 22, wherein the electromagnet includes an annular core surrounding the rear housing section and positioned to define an annular gap with one of the rear housing section and the jacket, the magnetorheological hydraulic fluid flowing from the at least one port provided in the housing through the gap.

24. The airbag inflator of claim 2, wherein the housing includes a first bore in a forward section thereof and a second bore in a rear section thereof, the first bore having a larger diameter than the second bore, the first piston comprising a head slidingly received in the first bore and a conjoined cylindrical skirt slidingly received in the second bore, the damping chamber being defined between a peripheral surface of the skirt and the first housing bore, the airbag inflator further comprising a port in the rear housing section having an open end exposed in the second bore, the port open end normally blocked by a terminal portion of the skirt peripheral surface, and an elongated groove of varying width and/or depth formed in the skirt peripheral surface to extend from the port blocking terminal portion of the skirt peripheral surface in the second axial direction toward the first piston head, whereby, upon movement of the first piston in the first axial direction, the port open end is exposed by the groove to permit a rate of hydraulic fluid flow from the damping chamber to varying as a function of first piston displacement and to produce corresponding variations in the retarding force.

25. The airbag inflator of claim 24, wherein a plurality of angularly spaced elongated grooves are formed in the skirt peripheral surface, the airbag inflator further comprising an annular groove formed in the second housing bore to expose the port open end, the terminal portion of the skirt peripheral surface normally blocking the annular groove.

\* \* \* \* \*